UNITED STATES PATENT OFFICE.

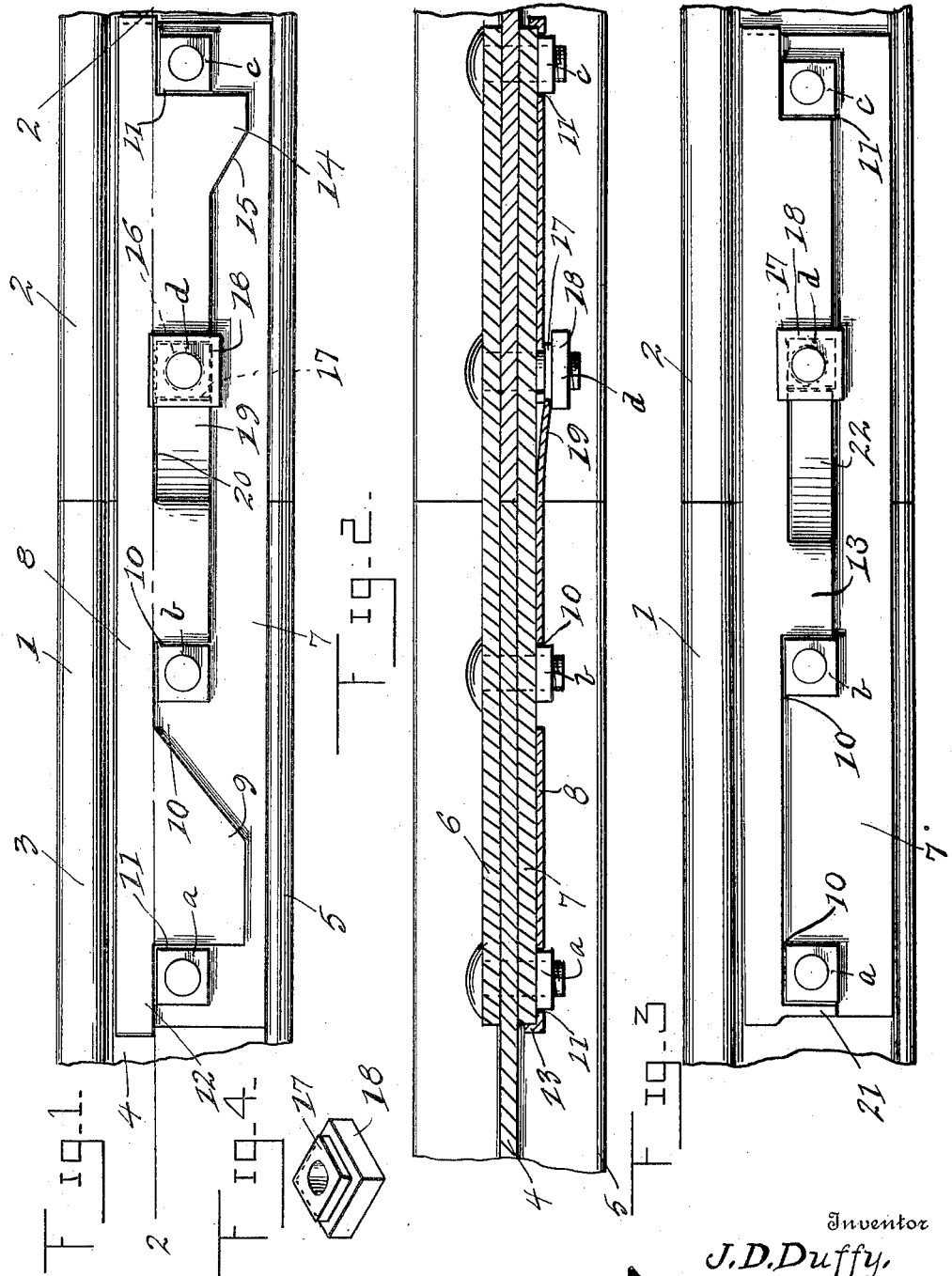

JOSEPH D. DUFFY, OF ST. CLOUD, MINNESOTA, ASSIGNOR OF ONE-HALF TO EMIL PUFF, OF ST. CLOUD, MINNESOTA.

NUT-LOCK.

1,087,740.  Specification of Letters Patent.  Patented Feb. 17, 1914.

Application filed March 17, 1913. Serial No. 754,870.

*To all whom it may concern:*

Be it known that I, JOSEPH D. DUFFY, a citizen of the United States, residing at St. Cloud, in the county of Stearns and State of Minnesota, have invented certain new and useful Improvements in Nut-Locks; and I do hereby declare the following to be a full, clear, and exact description of the invention, such as will enable others skilled in the art to which it appertains to make and use the same.

This invention relates to new and useful improvements in nut locks for rail joints, and more particularly to that type which is adapted to extend longitudinally of the rail and lock the numerous nuts and bolts from becoming accidentally displaced.

Another object of my invention is to provide a device which will be cheap to manufacture, simple in construction, and effective in operation.

With the above and other objects in view, I will now proceed to describe my invention in the accompanying drawings, in which—

Figure 1 is a side elevation of a fragment of a rail showing my improved nut lock applied thereto; Fig. 2 is a longitudinal section taken on line 2—2 of Fig. 1; Fig. 3 is a modified form of my improved nut lock; and Fig. 4 is a perspective view of one of the nuts which is used to lock the plate to the rail.

Referring to the drawings by characters of reference, 1 indicates the end of a railroad rail abutting the end 2 of the adjacent rail. These rails consist of the usual heads 3, webs 4, and flanges 5.

The usual fish plates 6 and 7 are provided for the connection of the rails, these fish plates being pierced at suitable intervals to receive the bolts. Adjacent one of said fish plates is provided a longitudinally extending plate 8 having a downwardly projecting member 9 formed adjacent one end. This downwardly projecting member 9 is preferably recessed as shown at 10 to receive the nut adjacent the end of the rail 1. An angular recess 11 is provided at each end of the locking plate, which is adapted to receive the nuts farthest from the ends of the respective rails, and lock the same from accidental rotation. One of the arms formed by this recess is extended as shown at 12, and bent at right angles to the surface of the plate, as clearly shown at 13. This angular extension 13 is adapted to extend around the end of the fish plate and lock the locking plate from longitudinal movement. Near the end opposite the recess 10 I provide a downwardly extending tongue 14, one side of which is beveled, as shown at 15, and extends upwardly for a short distance. Intermediate this downwardly extending tongue 14 and the recess 10 I preferably provide a recess 16 which is adapted to receive the end of a bolt. A shoulder 17 is formed on the nut 18 and is adapted to be engaged by a spring tongue 19 which is formed integral with the plate and immediately adjacent the recess as clearly shown, this tongue being adapted to spring outwardly and engage the nut when the same is in place.

In Fig. 3 I have shown a modified form of my improved nut lock and the recess 10 is extended, as clearly shown, to form the downwardly extending tongue 21, which is adapted to engage the side of the nut on rail 1 farthest from the end thereof. This improved embodiment is provided with a tongue 13 similar to the one previously described. Intermediate the ends of the locking plate I provide a downwardly extending tongue which is provided with a recess intermediate its ends. This downwardly extending tongue is formed integral with the locking plate, and has a resilient tongue 22 adjacent the recess, which is adapted to operate in a similar manner to the tongue 19 when the device is in place on the rail. The end of this locking plate is provided with an angular recess adapted to receive the nut farthest from the end of the rail 2, and lock the same from accidental displacement.

In the operation, the nuts will be referred to as $a$, $b$, $c$ and $d$, and will be placed on the rail in the usual manner. The plate 8 will then be placed over the same so that the walls of the recesses 11 will engage the nuts $a$ and $c$. The walls of recess 10 will engage the nut $b$. The nut $d$ is then placed on the remaining bolt with the shoulder 17 adjacent the fish plate. It will be seen that upon turning the nut the spring tongue 19 will be forced inwardly, and as the nut reaches its innermost position, the tongue 19 will engage one of the sides of the shoulder 17 and prevent the nut from becoming accidentally displaced.

While in the foregoing I have shown and described the preferred embodiment of my invention, it is to be understood that I may change the structure and arrangement of parts within the spirit and scope of the claims.

Having thus fully described my invention, what I claim is:

1. In a nut lock for rail joints, a plate, a downwardly extending tongue formed at one end of said plate, a downwardly extending tongue formed adjacent the other end of said plate, the second tongue being recessed, a resilient tongue forming one wall of said recess and adapted to engage a nut and thereby lock the same from accidental displacement.

2. In a device of the character described, a plate, the ends of said plate being extended to form recesses, a downwardly extending tongue intermediate the said recesses, the said tongue being provided intermediate its length with recesses adapted to receive the nuts of a rail joint, and a resilient tongue formed integral with one of the sides of one of said recesses and adapted to lock the nut within the said recess from accidental rotation.

3. In combination with a railroad rail joint having fish plates, a nut lock comprising a plate extending longitudinally of one of said fish plates, extensions formed integral with said plate and projecting longitudinally with relation thereto, said extensions forming recesses, the ends of said extensions being adapted to be bent around the fish plate, a downwardly extending tongue formed adjacent one of said recesses, said downwardly extending tongue having one of its sides beveled, a tongue formed intermediate said recesses, a resilient tongue formed integral with the downwardly extending tongue and extending longitudinally of the plate, a downwardly extending tongue formed intermediate the resilient tongue and the other of said recesses, said tongue being spaced from the resilient tongue to form a recess adapted to receive a nut, and a shoulder formed integral with the nut adapted to engage the resilient tongue and prevent said nut from being accidentally displaced.

In testimony whereof I affix my signature in presence of two witnesses.

JOSEPH D. DUFFY.

Witnesses:
J. I. DONOHUE,
JOSIE MURRAY.

---

Copies of this patent may be obtained for five cents each, by addressing the "Commissioner of Patents, Washington, D. C."